May 21, 1957  R. W. HEWES ET AL  2,793,095
SPEED INDICATING AND RECORDING DEVICE
Original Filed Aug. 5, 1949  6 Sheets-Sheet 2
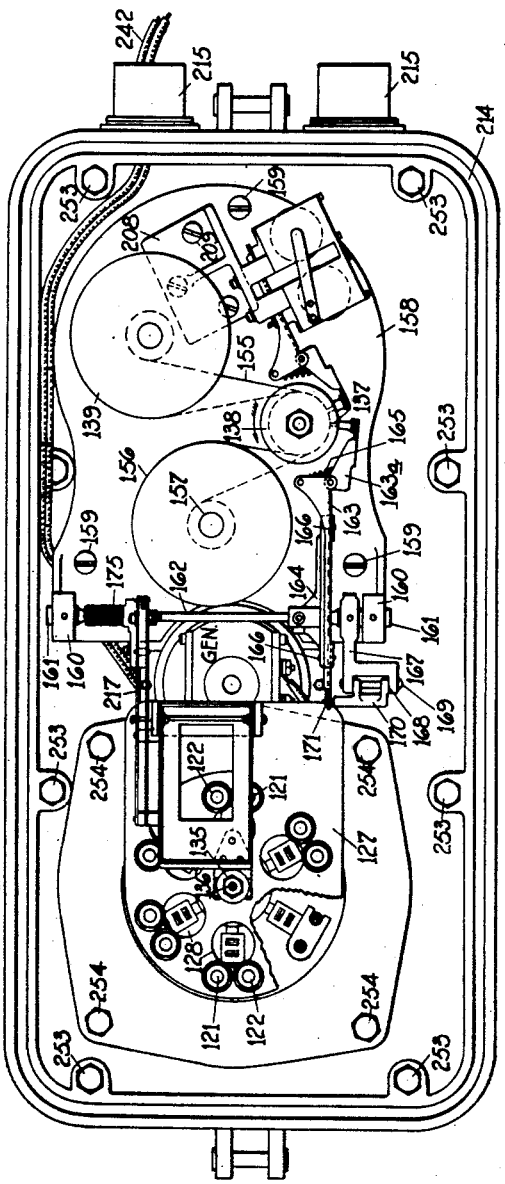
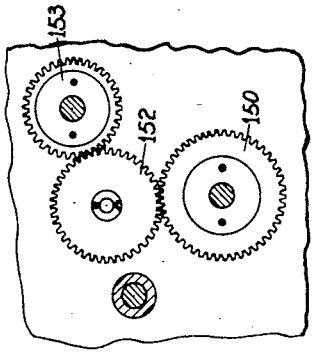
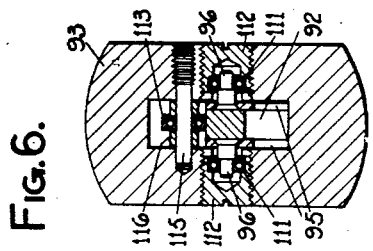
INVENTORS.
R.W.Hewes and S.M.Phelps.
BY
Forest B. Hitchcock
ATTORNEY

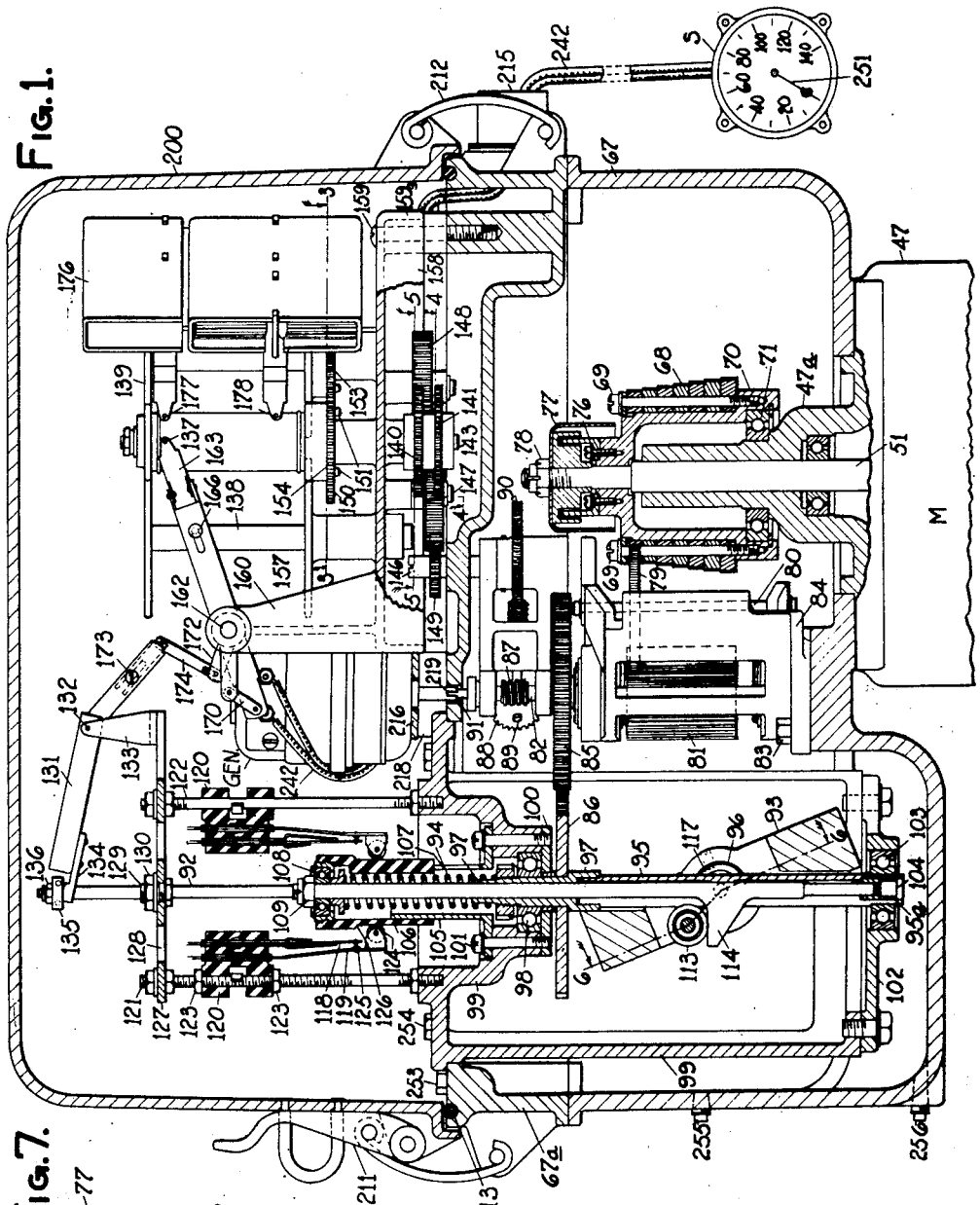

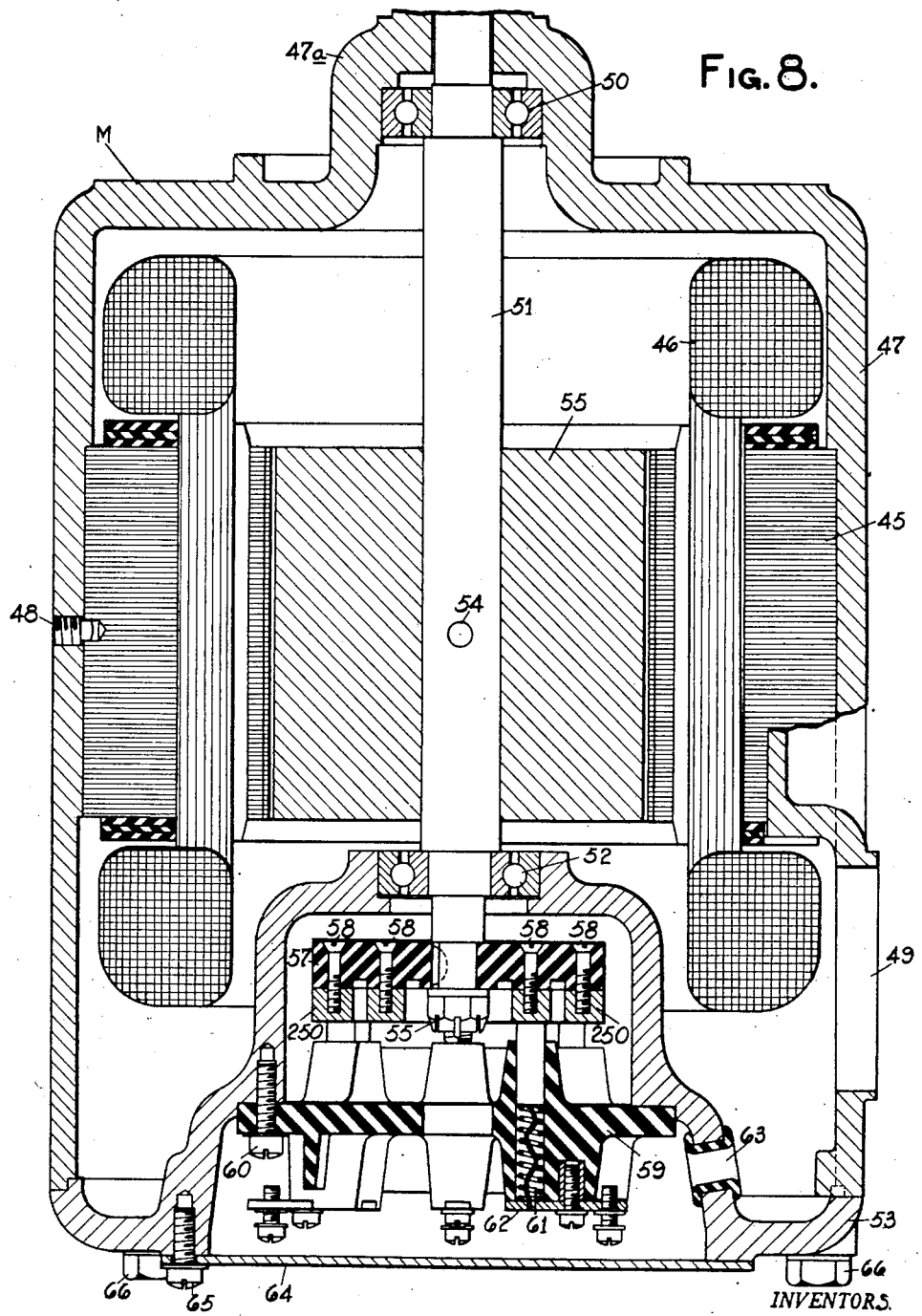

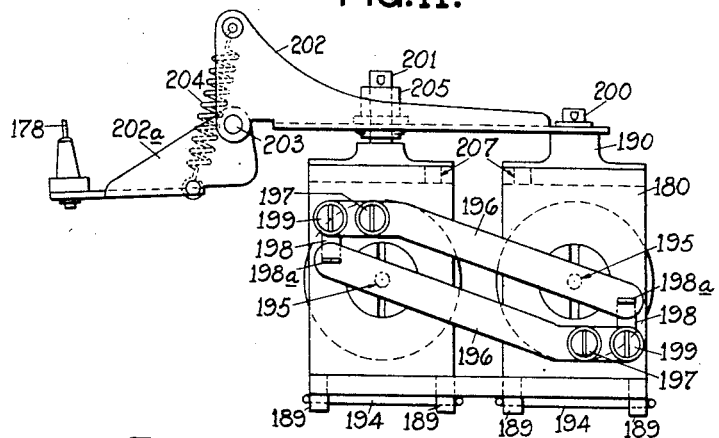
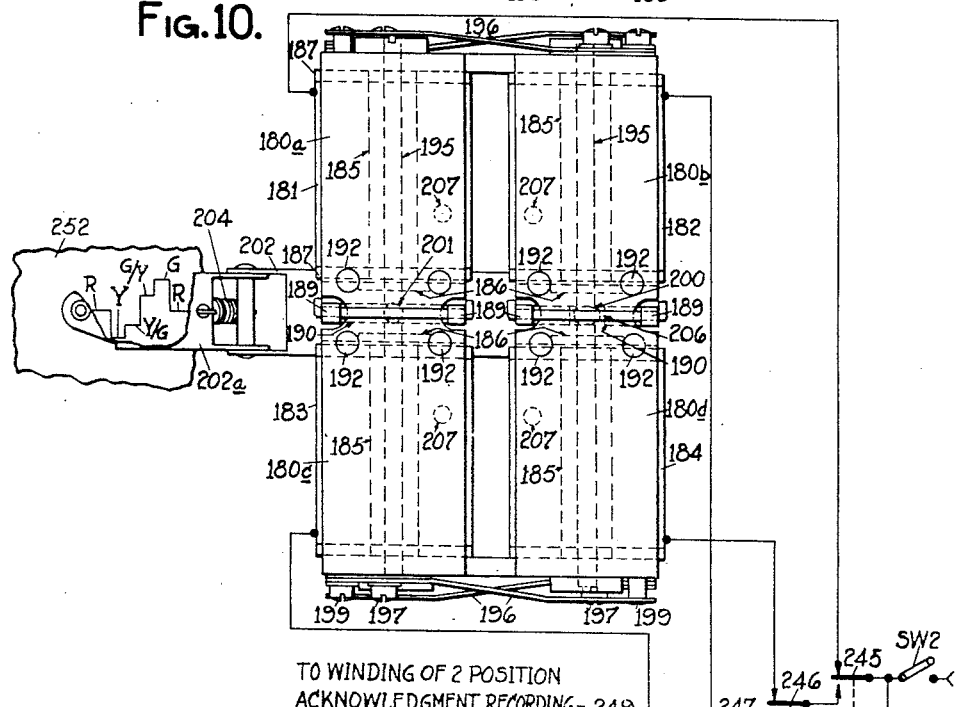
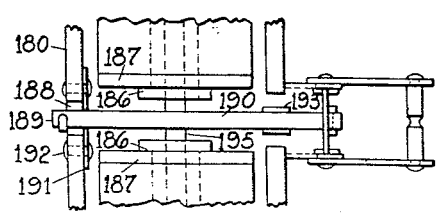

May 21, 1957  R. W. HEWES ET AL  2,793,095
SPEED INDICATING AND RECORDING DEVICE
Original Filed Aug. 5, 1949  6 Sheets-Sheet 6

INVENTORS.
R.W.Hewes and S.M.Phelps
BY
Forest B. Hitchcock
ATTORNEY

United States Patent Office 2,793,095
Patented May 21, 1957

2,793,095
SPEED INDICATING AND RECORDING DEVICE

Ralph W. Hewes and Stuart M. Phelps, Rochester, N. Y., assignors to General Railway Signal Company, Rochester, N. Y.

Original application August 5, 1949, Serial No. 108,847, now Patent No. 2,651,772, dated September 8, 1953. Divided and this application July 29, 1953, Serial No. 370,969

13 Claims. (Cl. 346—73)

This invention relates to speed indicating and recording devices, and it more particularly pertains to speed contactors and recorders such as are driven by an axle of the tender of a steam locomotive or a drive or idler axle of an electric or Diesel locomotive, for use as a part of train control and/or cab signalling systems.

The present application is a division of our prior application Ser. No. 108,847, filed August 5, 1949, now Patent No. 2,651,772, granted September 8, 1953.

The speed contactors commonly employed in practice are either directly driven by the axle or are driven by a flexible shaft connected to the axle. Difficulties have been encountered in both of these types to construct apparatus to withstand the vibration of direct mechanical connection to the axle; and even though a flexible shaft connection may be used, it is difficult to locate the speed controlled contacts and/or recorder apparatus in the most convenient place which may be quite remote from the connection to the end of an axle.

Generally speaking, and without attempting to define the scope of the present invention, the present invention provides for the driving of a speed contact operating mechanism and/or a speed recorder conveniently located somewhat remote from an axle by means of electrical connections with commutating apparatus which is directly associated with the axle.

The organization includes apparatus to check correspondence between the rotation of the axle and the rotation of a rotor that is electrically driven in accordance with the rotation of the axle. This is to check the integrity of the electric drive for the contactor and recorder.

The speed of the train and/or as many as five different signal indications are automatically recorded as the train progresses along its route. A five position signal recorder is provided that is actuated by an electromagnetic mechanism to any selected one of five different positions in accordance with the particular signal aspect that is to be recorded.

The speed contactor is a centrifuge driven device which is driven through a spring coupling means and through a ratio adjusting device adjustable for different sized wheels with which the mechanism may be associated.

An object of the present invention is to record by a single electroresponsive unit distinctively any selected one of five distinctive indications. These indications are generally different signal aspects.

Another object of the present invention is to provide ratio adjustment in the speed contactor and recorder mechanism for wheel wear compensation and for different sized wheels with which the mechanism may be associated.

Another object of the present invention is to provide speed coupling means whereby the inertia of the governor used in actuating the speed contacts is somewhat absorbed for abrupt changes in speed so as to permit the rotor of the motor driving the governor and the axle to keep in closer synchronism under these conditions and thus prevent the unnecessary indication of an out of correspondence condition by the dropping away of the normally energized corresponding relay.

Another object of the present invention is to provide an improved operating mechanism for a train recorder and speed contactor that is ruggedly constructed so as to be dependable in its operation, that is relatively free from vibration transmission from the axle, and that is free to be located at a convenient point remote from the axle from which it is driven.

Other objects, purposes, and characteristic features of the present invention will be in part obvious from the accompanying drawings, and in part pointed out as the description of the invention progresses.

In describing the invention in detail, reference is made to the accompanying drawings wherein corresponding parts are identified by corresponding reference characters throughout the several views and in which:

Fig. 1 is an elevational view partly in cross-section of a speed contact operating mechanism and recorder constructed according to the present invention;

Fig. 2 is a plan view of the recorder and speed governor mechanism with the cover removed;

Fig. 3 is a plan view of the take-up spool driven gearing of the recorder taken along the section line 3—3 of Fig. 1;

Fig. 4 is a plan view of one of the drive gears for the recorder platen taken along the section line 4—4 of Fig. 1;

Fig. 5 is a plan view of the drive gearing for the recorder platen taken along the section line 5—5 of Fig. 1;

Fig. 6 is a view of a centrifuge and shaft assembly taken along the section line 6—6 of Fig. 1;

Fig. 7 is a view in perspective with some parts shown in expanded relationship of a spring drive coupling that is used in the recorder to couple the drive shaft of the recorder motor to a gear ratio selector drive mechanism;

Fig. 8 is a sectional view of a motor and commutator organization that is used in driving the recorder and speed contactor mechanism;

Fig. 10 is a plan view of a five position recorder relay and stylus mechanism;

Fig. 10A is a fragmentary side view of the armature;

Fig. 11 is an elevational view of the five position recorder relay and stylus mechanism.

Figure 9:
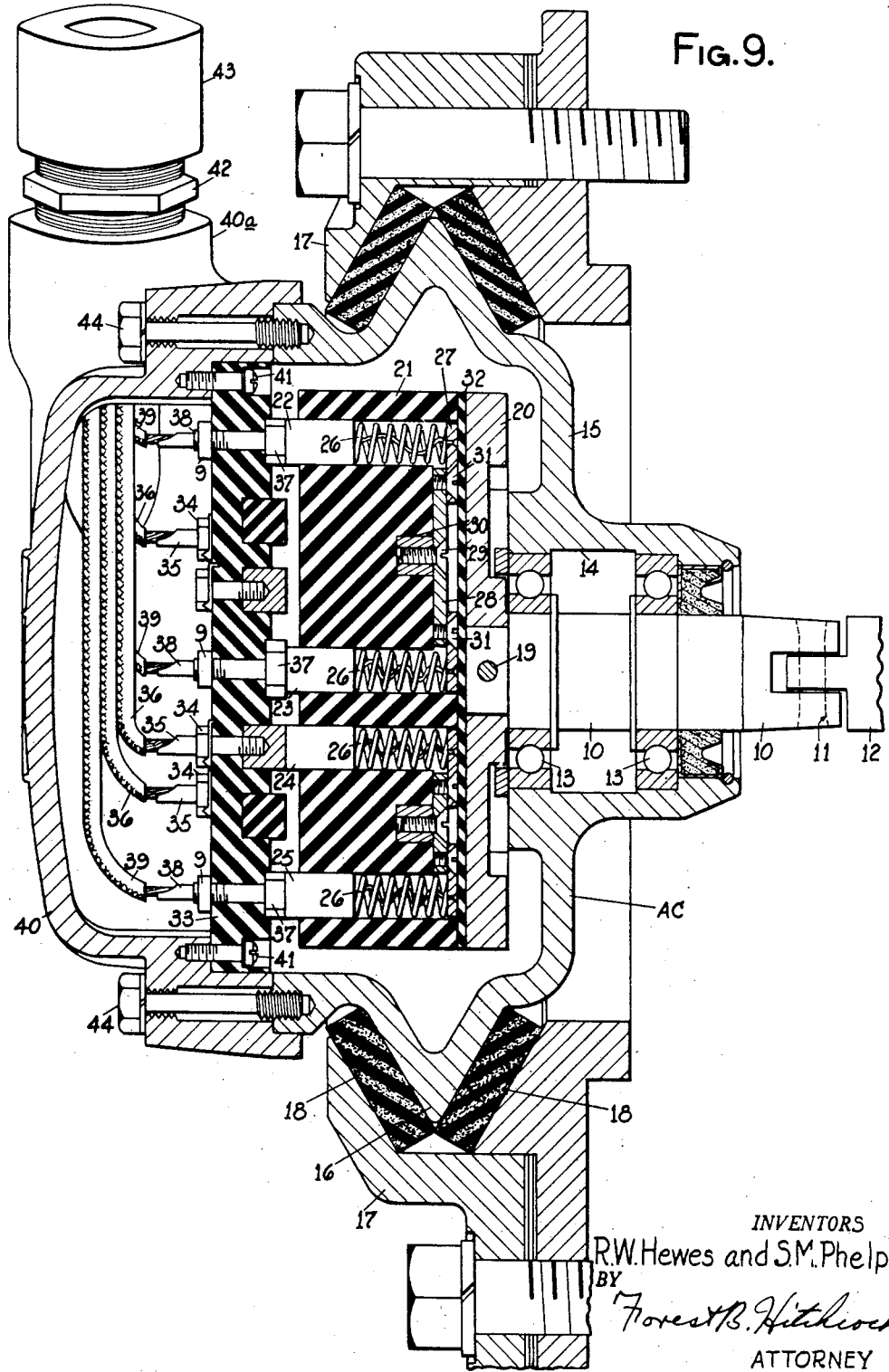
Fig. 9 is a sectional view of a commutator and axle driven brush holder organization that is directly associated with the end of a wheel axle.

With reference to Fig. 9, a shaft 10 is suitably coupled as by a universal joint 11 to the end 12 of a wheel axle, and the shaft 10 is suitably journaled by ball bearings 13 within a bearing nest 14 formed in a circular housing 15 having a rib 16 formed in the periphery thereof for use of securing the housing 15 to the journal box at the end of a wheel axle on a locomotive tender. The housing is preferably secured to the journal box by suitable brackets 17 which secure the rib 16 of the housing in position at the end of the journal box through the medium of suitable shock absorbing rubber pads 18 in a manner comparable to that which is fully disclosed for the attachment of a speed governor directly to the end of a journal box in the patent to H. B. Taylor, No. 2,457,748, dated December 28, 1948.

Secured to the left-hand end of the shaft 10 as viewed in Fig. 9 by the pin 19 is a brush holder disc 20. The disc 20 has secured thereto a brush holder 21 formed of insulating material which has cavities formed therein for receiving the respective brushes 22, 23, 24, and 25. The brushes are biased by suitable compression springs 26 which are maintained under compression between the brushes and a suitable plate 27. In addition to the brushes illustrated in the sectional view of Fig. 8, two additional brushes are similarly provided as is illustrated schematically in Fig. 12 for purposes to be hereinafter pointed out when considering the mode of operation of the system.

The brushes 22 and 23 are electrically connected by a strap 28 extending radially from the center of the brush holder 21 as viewed in Fig. 9, such strap being secured to the brush holder by a screw 29 threaded into an insert 30 which is suitably secured to the brush holder 21 as by being molded therein. This connecting strap 28 has secured thereto by screws 31 threaded into the strap 28, the respective plates 27 which make electrical connections to the brushes 22 and 23. Similarly the brushes 24 and 25 are connected together as well as other brushes at the sides thereof which are shown only in the schematic diagram of Fig. 12. The disc 20 is preferably of metal and is secured to the shaft 10 as has been described, and it is insulated from the brush connector plates 27 by a suitable disc 32 of insulating material.

A commutator plate 33 of insulating material has circumferential segments secured thereto by the studs 34 which have soldering lugs 35 for the attachment of wires 36 thereto. The segments are disposed at different radii about the center of the segment plate 33, some segments being formed by metal strips and some being formed by the heads of studs dependent upon the required spread of the contacting surfaces. The particular arrangement of the segments will be hereinafter considered more in detail along with a consideration of the mode of operation. The studs 37 which have their heads used for cooperating with brushes of the brush holder 21 are inserted through the commutator plate 33 from the right hand side as viewed in Fig. 9 and secured to the plate 33 by the nuts 9. The left hand ends of the studs 37 have integral wire terminals 38 to which the wires 39 are soldered. The commutator plate 33 is secured to a housing cover 40 by the screws 41, the housing cover 40 serving as a housing for the wiring connections to the commutator plate 33. The cover 40 has formed therein a threaded outlet 40a for receiving a nut 42 and a ferrule bushing 43 such as may be required for the connection of a weather proof cable or conduit. The cover 40 is secured to the housing 15 by the bolts 44, and when secured in this position the commutator segments bear against respective brushes of the brush holder 21. The manner in which the respective commutator segments are spaced about the center of the commutator plate is more clearly illustrated in the schematic diagram of Fig. 12, and will be more specifically considered when considering the mode of operation of the system.

With reference to Fig. 8, a direct current motor M is illustrated as being provided for driving the centrifuge speed contactor and the recorder, such motor being driven by the scanning of contact segments of the axle commutator mechanism AC (see Fig. 9) that has been described. It will be readily apparent as the description progresses that various types of direct current motors may be employed for this purpose. For this embodiment of the present invention a stator 45 having a distributed winding 46 is employed, such stator having a number of poles corresponding to the respective commutator segments that are scanned in one revolution of the axle by the axle commutator AC.

Figure 12:
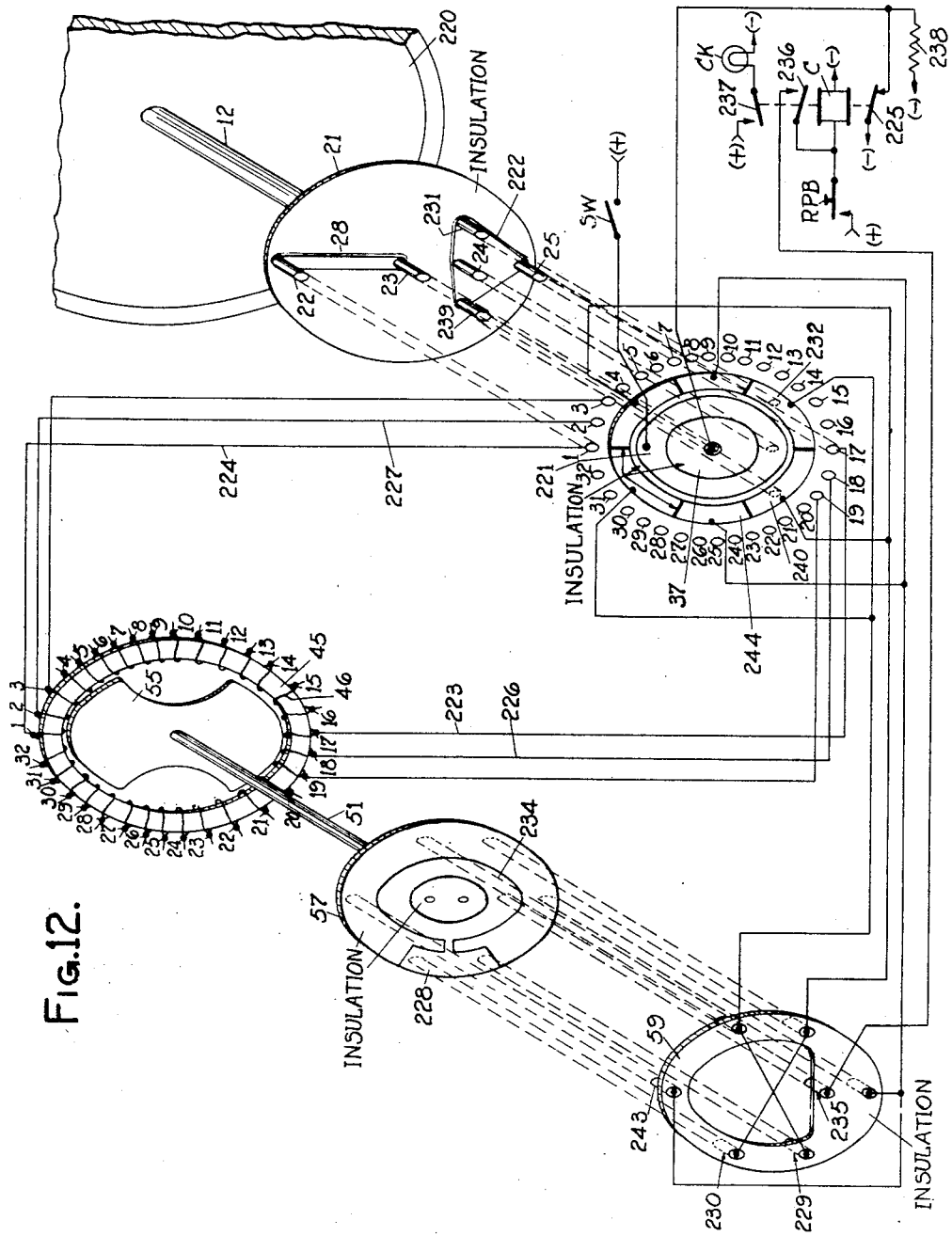
Fig. 12 is a schematic diagram illustrating the circuit organization for the drive of the recorder and speed contactor motor in accordance with the rotation of a wheel axle, together with checking means for checking correspondence of rotation of these respective rotating parts.

It is desirable from the standpoint of providing smooth operation of the motor that the direct current rotating field selected by the axle commutator AC and set-up in the stator 45 be rotated by short steps, and therefore it is desirable to employ a large number of poles in the motor M and a corresponding large number of field scanning segments of the axle commutator AC. Thus for this embodiment of the present invention, as illustrated schematically in Fig. 12, a thirty-two pole stator winding 46 is provided in the motor, and connections for the respective poles are made to respective segments of the axle commutator AC. Although a ring wound stator is illustrated in Fig. 12, it is to be understood that this form is selected more particularly to facilitate the schematic showing of the circuit organization, rather than to specify a particular type of stator winding as being required. It is thus to be understood that other well known types of windings, such as lap windings can be provided for the stator 45 in accordance with the requirements of practice.

With reference to Fig. 8, a motor shell 47 is illustrated in which is suitably secured as by the set screw 48, a thirty-two pole stator 45, provision being made by the opening 49 in the shell 47 for the passage of wires and the assembly of a suitable receptacle (not shown) for coupling a cable or conduit used for connecting the motor M with the axle commutator AC.

The upper end of the motor shell 47 is formed as a nest for a suitable radial and thrust bearing 50 for journaling the upper end of a rotor shaft 51. The other end of the rotor shaft is journaled by a suitable ball bearing 52 supported by an end plate 53 which has a cavity formed therein for housing a commutating organization that is used in checking the integrity of operation of the motor M with respect to the rotation of the wheel axle which indirectly drives the motor.

Secured on the rotor shaft 51 by the pin 54 is a rotor 55 formed of magnetic material having two small circular segments joined by a diametrically disposed bar. The periphery of the segments is concentric with the axis of rotation of the rotor. The rotor 55 thus has a tendency to follow a rotating field which is set up in the stator 45. By this arrangement there are no windings required on the rotor, and the rotor may be a permanent magnet or not, in accordance with the requirements of practice.

A commutator disc 57 of insulating material having commutator segments secured thereto by the screws 58, is keyed on the lower end of the shaft 51 as viewed in Fig. 8, and is secured on the shaft 51 by a nut 55 which is threaded onto the end of the shaft. A brush holder 59 is disposed opposite the commutator disc 57 and is secured to the end plate 53 by screws 60 in a position so that brushes within the brush holder 59 are biased against cooperating commutator segments by suitable biasing springs 61. The particular disposition of the brushes and the cooperating contacts segments will be hereinafter considered. Connection is made to the brushes through suitable pigtail connectors which are connected through respective plates 62 to wires (not shown) extending to the axle commutator AC and extending through a grommet 63 in the end plate 53 of the motor M. A cover plate 64 is secured across the lower end of the end plate 53, after connections have been made to the brush holder 59, by screws 65 that are threaded into the end plate 53.

The motor according to Fig. 8 is secured by suitable through bolts 66 to the under side of a speed contactor and recorder housing 67 as viewed in Fig. 1, the upper end of the rotor shaft 51 extending upwardly through the center of a stack of variable ratio speed control gears 68, which are secured together by through bolts 69 threaded into an inner cylindrical supporting structure 70 which is journaled to rotate about the extending end 47a of the motor shell 47 by a ball bearing 71 whose inner race is fitted over the extending end 47a of the shell 47 of the motor M.

The rotor shaft 51 therefore extends upwardly through the center of a variable ratio gearing cone 68 and through an opening in the upper end of the cylindrical supporting structure 70 of such stack. The upper end of the rotor shaft 51 is coupled to the variable ratio gearing through a spring coupling, the parts of which are more clearly illustrated in the enlarged and expanded view of Fig. 7.

With reference to Fig. 7, the rotor shaft 51 has keyed thereto a sector 72 having a circular channel 73 formed in the underside thereof for receiving a spring retainer cup 74, the sector 73 having abutments 72a formed therein in opposite sides thereof so that respective compression springs 75 held by the spring retainer cup 74 have their ends bearing against these abutments 72a. In this way the rotation of the sector 72 drives the spring retainer cup 74 through the compression of the springs 75, the cup 74 being suitably secured as by the screws 76 (see Fig. 1) to the cylindrical support 70 carrying the variable ratio gearing cone 68. It is thus provided that the variable ratio gearing cone 68 is driven by the rotor shaft 51 through a spring coupling including the springs 75, a suitable cup shaped cover 77 being provided over the coupling, and the coupling being retained on the end of the rotor shaft 51 by a nut 78 threaded on to the shaft 51 and locked in its assembled position as by a cotter key or safety wiring in accordance with the requirements of practice.

The variable ration gearing organization comprises an idler gear 79 journaled by a vertically disposed pin 80, the idler gear 79 being in mesh with a selected gear of the cone of gearing 68 on the cylindrical supporting member 70 and also in mesh with the relatively broad gear 81 which is secured on an output shaft 82. The breadth of the gear 81 permits the idler gear 79 to be selectively positioned in mesh with any one of the cone of gears 68 on the cylinder support 70 to select a desired ratio in accordance with the size of the tender wheel from which the axle commutator AC is driven. The adjustment of the ratio is accomplished by loosening a screw 83 which permits the frame support 84 carrying the pin 80 to be pivoted about the axis of the broad gear 81 to permit engagement with any particular diameter gear desired on the cone of gearing 68. After the desired adjustment is made, the idler gear 79 is locked against axial movement by a locking member (not shown) having a notch for each gear on the cone 68.

The output shaft 82 of the variable ratio mechanism has a spur gear 85 secured thereto which is in mesh with a gear 86 for driving the speed contactor, and this output shaft 82 also has secured thereon a worm 87 which is in mesh with a worm gear 88, which in turn through a shaft 89 with associated worm secured thereon drives a worm gear 90. Thus a substantial speed reduction is accomplished to provide a proper low speed drive for the recorder mechanism. Provision is made by a slotted connector 91 on the upper end of the shaft 82 for the connection of a shaft extension which may be used directly or remotely to drive a speed indicator.

The speed contactor that is driven by the output of the gear ratio selector mechanism comprises a central shaft 92 which is actuated axially in accordance with its actuation by a centrifuge 93 against the action of a biasing spring 94. A sleeve 95 is fitted over the lower portion of the shaft 92 having trunnions 96 (see Fig. 6) secured thereto for support of the centrifuge 93.

The drive of the centrifuge 93 is through the gear 86 which is secured over the sleeve 97 which in turn is fitted over the shaft 92 along its central portion. The gear 86 is in mesh with the output gear 85 of the ratio selector mechanism, and the sleeve 97 on which the gear 86 is secured is suitably coupled as by mating squared ends to the sleeve 95 carrying the centrifuge 93 so that the centrifuge 93 is turned in accordance with the rotation of the gear 86.

The sleeve 97 to which the gear 86 is secured extends upwardly as viewed in Fig. 1 through the inner race of a suitable ball bearing 98. The outer race of this ball bearing 98 is retained within the upper end of a supporting structure 99, the bearing 98 being retained within a nest in the structure by a plate 100 extending beneath the bearing 98, such plate being secured by the screws 101 to the supporting structure 99.

Secured to the lower end of the supporting structure 99 is a bearing plate 102 carrying a ball bearing 103 for journalling the lower end of the shaft 92 and of the sleeve 95. The lower end of the sleeve 95 is counterbored to receive a bushing 104 which is adapted to provide a bearing for the lower end of the shaft 92 as it is actuated axially by the centrifuge 93. The outer surface of the lower end of the sleeve is recessed to provide a shoulder 95a bearing against the inner race of the ball bearing 103.

A sleeve 105 is fitted over the shaft 92 to house the compression spring 94 and provide a guide for a contact actuating cam drum 106 of insulating material. The sleeve 105 has a flange formed at its base which is secured by the screws 101 to the top of the speed contactor supporting structure 99. This sleeve 105 has a longitudinal slot formed therein to receive a guiding key 107 formed in the cam drum 106 which is slidable axially outside of the supporting sleeve 105.

The upper end of the cam drum 106 is adapted to receive the ball bearing 108. A nut 109 is threaded onto the shaft 92 and located in a position bearing against the inner race of the ball bearing 108 so as to cause the cam drum 106 to be actuated by the axial movement of the shaft 92.

With reference to Fig. 6, the sleeve 95 extends through an opening at the center of the centrifuge 93. The sleeve 95 is provided with trunnions 96 for carrying the centrifuge 93. These trunnions 96 are journalled in bearings 111 which are mounted in plugs 112 which are threaded into the opposite ends of the centrifuge 93. Thus the centrifuge 93 is assembled on the sleeve 95 by being slipped over the sleeve 95 when disposed at a substantially 90° angle. After the centrifuge 93 is inserted in this manner, the plugs 112 can be threaded into the centrifuge 93 and over the trunnions 96 of the sleeve 95.

The axial movement of the shaft 92 is accomplished by the action of the ball bearing 113 in bearing against the surface of an extending ear 114 (see Fig. 1) of the shaft 92. This bearing 113 is illustrated in Fig. 6 as being centered on a pin 115 by suitable spacers 116 a short distance above the center of the centrifuge 93. The sleeve 95 (see Fig. 1) has an inner square portion at the point 117 near the center of the counter-weight which cooperates with a squared portion of the shaft 92 so as to cause the shaft 92 to be rotated in accordance with the rotation of the sleeve 95 as driven by the gear 86.

Respective pairs of contact fingers 118 and 119 are disposed about the periphery of the cam drum 106 so as to be actuated by the axial movement thereof, each of the pairs of contact fingers being supported in a block 120 of insulating material, which in turn is supported by a pair of studs 121 and 122 extending upwardly from the contactor supporting structure 99, each stud being threaded into the top of such structure. Thus it is illustrated in Fig. 2 that six pairs of studs 121 and 122 are disposed circumferentially about the shaft 92 which provides that six pairs of contact fingers 118 and 119 may be disposed about the cam drum 106. Each pair of contacts 118 and 119 is adjustable along the axis of the cam drum 106 by adjustment nuts 123 threaded onto the associated supporting stud 121. The contact fingers 118 are fixed in position, and the cooperating contact fingers 119 have rollers 124 secured to the lower ends thereof bearing against the cam drum 106 so as to selectively open and close the contact points 125 of the respective pairs of fingers as the drum 106 is moved axially so that the rollers 124 ride on raised portions 126 of the drum 106. The position of contact fingers 118 and 119 may be reversed if it is desirable for the downward movement of the sleeve 106 to close the fingers 118 and 119 rather than opening them as is shown in Fig. 1.

A cover plate 127 is secured at the top of the studs 121 and 122 having respective openings 128 formed therein for the passage of wires for attachment to the respective pairs of contact fingers. The shaft 92 extends through this plate 127 and through a suitable bushing 129 that is secured to the plate 127 by a nut 130.

The cover plate 127 for the contactor mechanism also serves as a support for a pusher cradle 131 which is pivoted by a pin 132 passing through an upwardly extending bracket 133, which in turn is secured to the cover plate 127.

The pusher cradle 131 is actuated about its pivot point 132 by a pusher arm 134 which bears upwardly beneath a cooperating thrust bearing 135 which is retained by a nut 136 threaded onto the speed contactor shaft 92. The actuation of this pusher arm 134 is effective to actuate a stylus 137 of the recorder in a manner which will be hereinafter considered.

The recorder has a platen 138 and a take-up spool 139 driven by a train of gears whereby the recorder platen 138 and the take-up spool 139 are always driven in the same direction, irrespective of the direction of movement of the vehicle with which the recorder is associated. This drive is provided by the over-running clutch gears 140 and 141 which have inner discs 142 (see Figs. 4 and 5) keyed to the platen shaft 143, such inner discs 142 having formed therein tapered races for balls 144 biased by springs 145 and arranged so that the gears 140 and 141 drive and slip in opposite directions.

It has been pointed out that the worm gear 90 (see Fig. 1) is driven by the output of the variable ratio selector, and this worm gear 90 by being secured to the shaft 146 drives the idler gears 147 and 148, one through the other, by the pinion 149 which meshes with the idler gear 147 as shown in Fig. 5. The idler gear 147 is in mesh with the over running clutch gear 141 on the platen shaft 143 while the idler gear 148 is in mesh with the other over running clutch gear 140 on the platen shaft 143. It will be thus seen that the two idler gears 147 and 148 have opposite directions of rotation, and therefore their respective associated over running clutch gears 140 and 141 also have opposite directions of rotation, slippage being provided for whichever of these gears 140 and 141 is rotated in the opposite direction to that direction which is required for the driving of the platen 138.

The platen 138 is formed as a cylinder fitted over the platen shaft 143 to provide a support for recorder tape as it is driven by the platen, and the platen 138 may include toothed ends (not shown) positioned for perforation of the recorder tape in accordance with the requirements of practice.

A suitable friction clutch 154 is provided on the lower end of the platen 138, as illustrated in Fig. 1 as a means for driving a gear 150 which is secured thereto by the screws 151. This gear 150 is in mesh with an idler gear 152 (see Fig. 3) which in turn drives a gear 153 which is secured to a lower flange (as viewed in Fig. 1) of a take-up spool 139. Slippage in the clutch 154 to which the platen gear 150 is secured takes care of the variable diameter of the take-up spool 139 as the recorder paper 155 is wound thereon as is indicated in Fig. 2. The recorder paper is fed from a spool 156 at the left of the platen as viewed in Fig. 2 on a shaft 157.

The gearing in connection with driving the recorder platen 138 and the take-up spool 139 is journaled by pins extending downwardly from bosses formed in the lower side of a recorder base plate 158 as illustrated in Fig. 1. This base plate 158 is secured to a supporting structure formed as part of the housing 67a by the screws 159, thus making the recorder unit readily detachable from the housing 67a without disturbing the assembly of the recorder drive gearing.

Formed at the left-hand end of the base plate 158 as viewed in Figs. 1 and 2 is a pair of trunnions 160 which have secured therein needle point or jeweled bearings 161 for the support of a stylus shaft 162 which is rotated in accordance with the axial movement of the speed contactor shaft 92.

With reference to Fig. 2, an articulated stylus operating finger 163 is secured to an operating arm 164, which in turn is secured on the stylus operating shaft. The finger 163 has a pivoted tip 163a carrying a stylus 137 bearing against the platen 138, such stylus 137 being biased against the platen by a spring 165 connecting the pivoted tip 163a of the finger 163 so as to attract the stylus 137 in the direction of the platen 138.

The stylus finger, although being secured with respect to rotation to the stylus operating shaft, arm 164 by the pins 166 is slidable longitudinally (transverse of the stylus shaft 162) so that the stylus 137 may be actuated longitudinally during its movement across the platen in order to obtain recording characteristics comparable to the strictly lateral movement of the stylus in accordance with changes in the speed to be recorded. In other words, the stylus operating finger 163 is compensated for circular movement about its pivoted point at the bearing 161. This is accomplished by a retracting linkage comprising a bracket 167 (see Fig. 2) secured to the fixed bearing 161, such bracket 167 having trunnions 168 between which is pivoted by the pin 169 a link 170 which is operatively connected to the stylus operating finger 163 at the point 171. It is this connection that retracts the stylus operating finger 163 to provide straight line scanning of the finger across the platen, longitudinal slots (not shown) being formed for passage of the shaft 162 and the pins 166 to permit longitudinal movement of the finger 163 in accordance with its connecting linkage 170.

Connection of the stylus operating shaft 162 to the pusher actuated cradle 131 is accomplished by linkage actuating a crank 172 (see Fig. 1) that is secured to the stylus shaft 162. The connecting link 173 is rigidly secured to the pusher cradle 131 so as to be actuated in accordance with the actuation of the cradle about its pivot point 132. A link 174 connects the link 173 to the crank 172.

In order that the pusher 134 may be biased against the underside of the thrust bearing 135 on the speed contactor shaft 92, a torsional spring 175 (see Fig. 2) is provided on the upper end of the stylus operating shaft 162 as viewed in Fig. 2 and adapted to bias the shaft 162 in a clockwise direction of rotation and thereby maintain the pusher 134 in a position bearing against the underside of the thrust bearing 135.

In addition to the apparatus that has been described for recording the speed of the vehicle, provision is made by a two-position electro-responsive device 176 for actuating a stylus 177 which may be used for recording conditions of manual acknowledgment of restrictive signal indications in a train control system. Another stylus 178 is provided as being actuated by a five position electro-responsive means so as to distinctively record any one of five distinctive signal aspects that may be displayed by a cab signal.

With reference to Figs. 10 and 11, a supporting structure 180 is formed of magnetic material for the five positioned relay, the structure 180 being formed as two laterally spaced C-shaped structures forming magnetic pole pieces 180a, 180b, 180c and 180d having a common back portion. Within each of these C-shaped structures is disposed a pair of oppositely disposed windings with suitable magnetic cores extending through the center thereof and secured into the supporting structure 180, the windings 181, 182, 183, and 184 are associated with the respective magnetic poles 180a, 180b, 180c, and 180d, and the cores 185 pass through the centers of the respective windings.

The cores 185 have pole pieces 186 at the inside ends thereof as viewed in Fig. 10 which maintain the windings 181, 182, 183 and 184 respectively in their assembled positions on the respective cores 185 disposed between discs 187 of insulating material.

Openings 188 are formed in the back of the supporting structure 180 as is shown in Fig. 10A for the passage of trunnions 189 of each of two armatures 190, one armature 190 being disposed between the poles of each C-shaped magnetic structure of the supporting structure 180. These trunnions 189 of the armatures 190 are inserted through respective bearing plates 191 of non-magnetic material and through the openings 188 in the supporting structure 180, the bearing plates 191 being secured to the supporting structure by the rivets 192, and affording substantial knife edge bearings for the armatures 190.

Each of the armatures 190 is formed of magnetic material and is disposed to be actuated in one direction or the other about its pivot point formed by the associated bearing plate 191 in accordance with its magnetic attraction. Each armature 190 therefore extends through the center of the associated C-shaped portion of the supporting structure 180 and through the openings formed by the open ends of that portion of the structure. As viewed in Fig. 10A, a residual pin 193 of non-magnetic material is suitably secured in each of the armatures 190 opposite the poles of the associated C-shaped portions of the structure 180 so as to protrude slightly from the surface of the armatures 190 as a means for limiting the extent of actuation of the armatures when attracted by the energization of one of the electromagnets with which it is associated. At the time of assembly of the relay, the armatures are secured within their bearing plates 191 by wires 194 passing through their trunnions 189 as is shown in Fig. 11.

The respective armatures 190 are normally centered between the oppositely disposed pole pieces 186 of the C-shaped magnetic structures with which they are associated by plungers 195 of non-magnetic material extending through the centers of the respective cores 185, such plungers 195 being urged against the armatures 190 by leaf springs 196 which are secured to the supporting structure 180 of the relay by the screws 197, one leaf spring 196 being provided for biasing each of the plungers 195 against the associated armature 190. Associated with each leaf spring 196 is a stop 198 which is secured to the structure by a screw 199 and has an upwardly turned end portion 198a extending underneath the associated biasing leaf spring 196 to limit the extent to which that leaf spring biases its associated plunger 195 so as to normally center the respective armatures 190 between their associated oppositely disposed pole pieces 186 when no energy is applied to the windings of the relay.

With reference to Fig. 11, the two armatures 190 have pins 100 and 201 respectively extending from their ends opposite from their pivot points for journaling a channel shaped stylus operating finger 202 which is preferably formed of non-magnetic material. This stylus operating finger 202 is articulated by the end piece 202a being pivoted at the point 203. The stylus 178 is secured to the articulated finger 202 and it is biased against the platen 138 by the tension of a spring 204 which has its ends anchored to the respective pivoted parts of the articulated operating finger 202.

The pin 201 extending from the left-hand armature 190 as viewed in Figs. 10 and 11 is round and is journaled in a bearing 205 which is secured in the channel shaped operating finger 202. The pin 200, however, that extends from the other armature 190 is preferably oval in shape and fitted into a slightly larger longitudinal slot 206 in the finger 202 to allow for the difference in spacing of the pins 200 and 201 of the respective armatures 190 as these armatures are respectively actuated in accordance with the selective energization of the windings 181, 182, 183, and 184.

Tapped holes 207 are provided in the poles 180a, 180b, 180c, and 180d for use in securing the relay to a suitable mounting bracket such as the bracket 208 (see Fig. 2) which in turn is secured to the recorder base plate 158 by the screws 209.

Although only the structure of the five position relay has been specifically considered, it is to be understood that the two-position relay as shown in Figs. 1 and 2 can be similarly constructed except that only the portion of the electromagnetic structure including one winding and one core is required in order to provide for the two-positioned actuation of the associated stylus 177.

For the purpose of rendering the recorder and the contacts of the speed contactor readily accessible for inspection and servicing, a relatively deep cover 210 (see Fig. 1) is employed which is readily removable upon the opening of a spring hasp 211 at the left-hand side as viewed in Fig. 1, and the removal of a spring catch 212 on the opposite side of the cover 210. The cover 210 when secured to the supporting plate 67a by the hasp 211 is tightly sealed by cording 213 or other packing provided in a channel 214 (see Fig. 2) extending about the periphery of the upper edge of the housing 67a. Provision is made by suitable quickly detachable connectors 215 provided in the right-hand side of the support 67a as viewed in Figs. 1 and 2 for the purpose of bringing wires into the housing for connection to the respective relays and to the respective contact fingers of the speed contactor and recording relays.

It will readily be apparent that various types of speed indication means can be provided as being driven by the shaft 91. If the speed indicator is to be separate from the case 67, it may be electrically driven by a direct current generator as is illustrated in Fig. 1 whereby there is no mechanical connection between the mechanism contained in the case 67 and the speed indicator S. Thus according to the embodiment shown in Fig. 1, for example, a direct current generator Gen. is mounted on a suitable bracket 216 which is secured to the supporting plate 67a by bolts 217 extending through suitable spacers 218. Thus the direct current generator Gen. can be mounted with its shaft 49 extending through the supporting plates 67a so as to be rotatively coupled to the connector 91 on the shaft 82. If it is not desirable to couple the generator shaft directly to the end of the shaft 91, an extension shaft may be employed according to the requirements of practice. The output of the generator Gen. is fed through the wires 242 and through one of the quickly detachable couplings 215 to the speed indicator S. The speed indicator S illustrated in Fig. 1 is assumed to be of a type wherein the indicator needle 251 is rotated clockwise to provide a speed indication comparable to the potential applied to the speed indicator S from the generator G. Thus the speed indicator S is actuated by a mechanism comparable to a direct current voltmeter needle, the markings on the dial being in miles per hour rather than being indicative of the voltage that is applied to the instrument.

If it is desirable in the practice of the present invention that the speed indicator be mechanically driven, rather than electrically driven, the indication dial may be provided on a shaft 162, or may be otherwise mechanically driven in accordance with the longitudinal movement of the shaft 92 of the speed contactor mechanism. If the speed indicator is made a part of the assembly as shown in Fig. 1, it may be desirable to locate this entire mechanism in a position within convenient view of the engineer, and under these conditions it may be desirable to provide a glass or transparent plastic covered opening in the cover 210 so that the speed indicator and also the platen 138 of the recorder are within convenient view of the engineer.

The supporting plate 67a when secured by the bolts 253 to the case 67 (and when the speed contactor is secured by the bolts 254 to the supporting plate 67a), seals off the lower section of the mechanism as viewed in Fig. 1 from the upper portion of the mechanism so that the lower portion of the case 67 can be filled with oil without splashing onto the contacts or recording tape. It is filled preferably up to a level as indicated by the position of the fill plug 255 in the case 67 whereby some of the gearing runs in oil and other parts of the mechanism are lubricated by oil thrown off of the centrifuge, the gear 81 and the gearing cone 68 being partially submerged in oil. The inclusion of plug 256 in the lower portion of the case 67 permits the draining of the oil when the oil is to be changed.

Having thus considered the specific structure of the speed contactor and recorder provided according to the present invention, consideration will now be given as to the mode of operation of the organization as provided by the present invention.

*Operation*

According to the general mode of operation of the system, as the wheel axle 12 to which the axle commutator is coupled rotates, the brushes 22 and 25 scan the contact studs which are circumferentially disposed in the commutator plate 33. These studs are numbered 1 to 32 inclusive in Fig. 12, and respective positive and negative battery connections are made to oppositely disposed studs as scanning takes place. In this manner a rotating field is set up in the stator 45 because of connections of these contact studs to the stator 45 of the motor. This field is rotated directly in accordance with the rotation of the brushes 22 and 25 as the wheel axle 12 is rotated. Because of this rotating field being set up in the stator 45 of the motor, the magnetic rotor 55 follows the field in its rotation, and thus because of the rotor shaft 51 driving the speed contactor and the recorder by gearing that has been described, the contacts of the speed contactor are actuated in accordance with their settings corresponding to different speeds of the vehicle, and the speed the vehicles travel is recorded by the recorder.

With reference to the schematic diagram of the circuit organization of Fig. 12, the symbols (+) and (—) have been used to indicate connection to the respective positive and negative terminals of suitable batteries or other sources of direct current. The system as illustrated in Fig. 12 is assumed to be inactive, and power is removed from the circuit organization by the switch SW being in its open position. To consider putting the system into operation, it will be assumed that the switch SW is closed at a time when the vehicle is not moving and at a time when the wheel 220, axle 12, and connected brush holder 21 are in the positions illustrated in Fig. 12.

Under these conditions the stator winding 46 of the motor is energized by a circuit extending from (+), including the switch SW, commutator ring 221 of the axle commutator AC, brush 24, brush connector plate 222, brush 25, contact stud No. 17 of the axle commutator AC, wire 223, windings 46 of the motor stator 45, wire 224, stud No. 1 of the axle commutator AC, brush 22, brush conector 28, brush 23, center stud 37, of the axle commutator AC and back contact 225 of relay C, to (—).

The setting up of a field in the stator 45 of the motor due to the energization of this circuit draws the magnetic rotor 55 into position in alignment with the field as is illustrated in Fig. 12. If this rotor 55 is a permanent magnet, it will align its poles in series with the poles of the stator 45 set up by the energization of the circuit that has been described, irrespective of the position that the rotor 55 has assumed prior to the closure of the switch SW. If, however, the rotor 55 is of soft iron rather than being a permanent magnet, because of its having no polarity of its own, it is drawn into the position of alignment with the field from its prior position by the shortest path of rotation, and therefore it may be drawn directly into correspondence with the axle commutator AC, or it may be drawn into alignment with the field 180° out of correspondence with the axle commutator AC. From the standpoint of economy in construction of the motor, and other considerations, it is believed that it may be preferable to use of soft iron rotor, and thus the circuit organization for checking the integrity of the follow up system has been organized so as to check the position of the rotor 55 at either a direct corresponding position or a position 180° out of correspondence.

If the axle 12 is rotated in a clockwise direction (as viewed in Fig. 12) from the above described position, the brushes 22 and 25 make contact with the respective studs Nos. 2 and 18 of the axle commutator AC and thus provide for the application of energy by the wires 226 and 227 to the taps Nos. 2 and 18 of the winding 46 of the stator 45. It is preferable that the circuit be closed through these wires prior to the opening of the circuit that has been described through the wires 223 and 224 in order that there may be no interruption in the energization of the stator winding 46. It will be noted that the resultant field due to energization of the stator winding 46 under these conditions is shifted slightly in a clockwise direction of rotation in accordance with the rotation of the brush holder 21 of the axle commutator AC. In accordance with the rotation of the field of the stator 45 under these conditions, the rotor 55 follows the rotation of the field and thus initiates the driving of the speed contactor mechanism and the recorder.

As the clockwise rotation of the axle 12 progresses, the brushes 22 and 25 move off of the studs Nos. 1 and 17 of the axle commutator and thus remove energy from the wires 223 and 224 so that the rotating field is moved another step in a clockwise direction in the stator 45, and the magnetic rotor 55 of the motor follows this rotation.

In a similar manner, as rotation of the axle 12 progresses, the scanning of the studs of the axle commutator AC by the brushes 22 and 25 applies energy to respective taps of the winding 46 of the stator 45 to rotate the field of the stator in correspondence with the rotation of the axle 12. It is thus provided, because of the number of taps on the stator winding 46 corresponding with the number of studs of the axle commutator AC that one complete revolution of scanning of the studs of the axle commutator accounts for one complete revolution of the magnetic field set up in the winding 46 of the stator of the motor.

The motor shaft 51 is therefore rotated by a step by step rotation of the stator field, and therefore the smoothness of rotation of the shaft 51 is dependent upon the number of poles that are employed and the corresponding number of commutator studs on the axle commutator AC. It has been shown that by the use of the 32 pole stator 45 as has been described that the field is rotated by 64 steps for each revolution of the motor shaft 51, there being additional steps formed by the axle commutator brushes 22 and 25 contacting adjoining studs at the same time in shifting from one stud to the next. It will therefore be apparent that a greater or lesser number of poles may be employed in accordance with the requirements of practice, dependent upon the smoothness of operation that is desired.

It will be noted that in the commutating means that has been described, the brush holder 21 is rotated by the axle 12, and thus the large number of wiring connections to be made to the commutator segments of the commutator disc 33 can be made to stationary segments without an excessive number of brush or slip-ring connections being required. In the motor commutator, however, it has been found expedient that the brush holder 59 be stationary from the standpoint of reducing the number of electrical connections necessary to moving parts. Although the commutating structures that have been described are desirable from the standpoint of simplicity of structure, it is to be understood that other combinations of commutating apparatus can be employed in accordance with the requirements of practice.

As an additional means to smooth the step by step rotation of the shaft 51, the shaft 51 is coupled through the spring coupling that has been described with reference to Fig. 1 so that the spring 75 tends to absorb any unevenness there may be in the rotation of the shaft 51 due to the step by step rotation of the motor field. The use of the spring coupling for this purpose prevents chattering in the gearing that might result if the spring coupling were not used.

Selection of the proper gear ratio is made by loosening the bolt 83 (see Fig. 1) and adjusting the gear 79 axially to the desired ratio in a manner which has been considered in describing the structure in detail of the variable ratio selector means. This cone of gearing 68 is arranged in steps to compensate for wear of the wheels of the vehicle in steps of .25 inch radius. In other words, the selector is actuated to the next higher gear ratio for each .25 inch radius wear of the wheel of the vehicle from which the speed contactor and recorder are driven.

The driving of the output shaft 82 of the variable ratio selector provides for the rotation of the centrifuge 93 at a relatively high speed and for the rotation of the recorder platen 138 at a relatively low speed through gearing and coupling means as has been heretofore described. As the centrifuge 93 is acuated outwardly in accordance with the speed of rotation, it actuates the shaft 92 downwardly, and thus the cam drum 106 is acuated downwardly so that its respective cam actuating surfaces selectively actuate the rollers 124 of the respective contact finger 119 in accordance with the adjustment of the contacts along the threaded rods 121 so as to actuate the contacts to open or closed positions as desired at particular selected speeds. The downward movement of the shaft 92 in accordance with the speed of rotation of the centrifuge 93 actuates the stylus operating finger 163 downwardly across the platen 138 as viewed in Fig. 1, the finger 163 being withdrawn by the linkage 170 as the stylus 137 is moved toward the center of the platen 138 to provide for straight line operation of the stylus 137 lengthwise of the platen 138 as has been described.

If the rotation of the shaft 51 is clockwise as viewed from the motor toward the end of the shaft illustrated in Fig. 1, the platen 138 is driven by the gear 141, and the other gear 140 on the platen shaft 143 slips its over-running clutch due to its direction of rotation being the opposite to that which is required for the recorder paper to be wound onto the takeup spool 139. If the direction of rotation of the shaft 51 is reversed as for the opposite direction of movement of the vehicle with which the apparatus is associated, the gear 140 on the platen shaft 143 becomes the drive gear for the platen 138, and the other gear 141 slips by means of its over-running clutch because its direction of rotation is opposite under these conditions to that which is required for the drive of the platen 138.

The speed contactor and stylus 137 are obviously similarly actuated for either direction of rotation of the gear 86 so that it is unnecessary to provide a unidirectional drive for the centrifuge 93.

Assuming that the switch SW has been closed under the above described conditions and the rotor attracted to the vertical position illustrated in Fig. 12, the attached commutator disc 57 is positioned as shown with its contacting segment 228 in a position making electrical connection with the respective brushes 229 and 230 of the fixed motor brush holder 59. To pick up the correspondence relay C after power has been applied to the system by the switch SW, the reset push button RPB is momentarily actuated and is thus effective to pick up the relay C in an obvious manner. Upon the picking up of this relay subsequent to the motor rotor having assumed the position as illustrated, a stick circuit is closed for the relay C extending from (+), including switch SW in its closed position, commutator ring 221 of the axle commutator AC, brush 24, brush connector plate 222, brush 231, commutator segment 232 of the axle commutator, brush 229 of the motor brush holder 59, contact segment 228 of the motor commutator, commutator ring 234 of the motor commutator, brush 235 of the motor brush holder 59, front contact 236 of relay C and winding of relay C, to (—). It is thus provided that relay C is maintained picked up by its stick circuit provided that the rotor 55 has properly aligned itself with the poles selected by the axle commutator AC.

The picking up of relay C under these conditions closes an obvious circuit at its front contact 237 to energize the correspondence lamp CK which indicates that there is correspondence between the axle commutator AC and the motor (or the motor rotor is 180° out of correspondence). The picking up of relay C also reduces the potential applied to the stator winding 46 of the motor by the opening of its back contact 225, thus requiring the energy for this stator winding 46 to be taken through a resistor 238 which is connected in multiple with the back contact 225 of relay C. The purpose of this arrangement is to automatically apply a higher potential for the drive of the motor whenever it becomes out of correspondence with the axle commutator AC so as to more definitely assure that it will regain a condition of correspondence with respect to the rotation of the wheel axle 12 that it is intended to follow.

The stick circuit that is closed for the relay C under the above described conditions also includes a multiple circuit connection including the brush 239 of the brush holder 21, the commutator segment 240 of the axle commutator AC, and the brush 230 of the motor brush holder 59. It is thus provided that there is an overlapping of circuit connections for the stick circuit of the relay C as the motor and axle commutator AC revolve, the axle commutator AC stepping from segment to segment in correspondence with the segment 228 of the motor commutator stepping from brush to brush of the motor brush holder 59. It will be readily apparent that this is true, irrespective of the direction of rotation of the wheel axle 12 and of the motor.

To consider a specific condition of the scanning of the respective correspondence commutator segments and brushes upon rotation of the wheel 220 and axle 12 of the vehicle, clockwise rotation will be assumed starting from the point that has been illustrated in Fig. 12. As the axle commutator brush holder 21 is rotated in a clockwise direction, the brushes are so disposed that the brush 231 makes contact with the commutator segment 240 prior to the brush 239 breaking contact with that same segment, and because of the assumed clockwise direction of rotation, the sector 228 of the motor commutator moves out of electrical contact with the brush 229, but the stick circuit is maintained for the correspondence relay C through the brush 230 until after the commutator segment 228 has moved to a position where it makes electrical connection with the brush 243 at the top of the brush holder 59. At this time, the brush holder 21, driven by the axle 12, has been rotated to a position where the brush 239 is making contact with the segment 244 of the axle commutator AC so that energy is provided for the stick circuit of relay C through brush 239 of the axle commutator AC, segment 244 of the axle commutator AC and upper brush 243 of the brush holder 59 of the motor. The segment 228 of the motor commutator is of a length slightly greater than the spacing of the brushes about the periphery of the brush holder 59 of the motor, and thus when rotation has progressed to the point where the brush 243 makes contact with the segment 228, the brushes 230 and 243 of the motor brush holder 59 are both making contact with the segment 228 and energy is supplied through both segments 240 and 244 of the axle commutator AC.

Having thus pointed out specifically how the stick circuit for the correspondence relay C is maintained during rotation from one specific segment to the next of the axle controller AC, providing that the motor rotor 55 is rotated correspondingly, it is to be understood that a similar mode of operation is effective as the other segments are scanned upon rotation of the axle 12. Thus for each revolution of the axle 12, the brushes 231 and 239 scan the respective six segments of the axle commutator, and, provided that the motor commutator disc 57 is correspondingly rotated, the correspondence relay C is maintained steadily energized by its stick circuit.

In accordance with the adaption of the corresponding checking circuit for use with a soft iron rotor 55, it is provided that the stick circuit for the correspondence relay C can be established with the motor commutator disc 51 in either of two 180° displaced positions. This is done because of the non-polar characteristics of the rotor 55 being effective to cause the rotor to align itself with the magnetic field of the motor upon the closure of the power switch SW by travel through the shortest path as has been described. Thus upon application of power to the system, the segment 228 of the commutator disc 57 may assume either of two 180° displaced positions.

It is therefore provided that oppositely disposed brushes about the periphery of the brush holder 59 are connected together and are connected to the same segments of the axle commutator AC so that circuitwise it makes no difference whether the sector 228 is in either of the two 180° displaced positions. It will be apparent that one brush of each jumper connected pair of the brush holder 59 could be eliminated if a second segment 228 were provided disposed 180° from the segment 228 of the commutator 57 as shown in Fig. 12. Because of the oppositely disposed brushes of the motor brush holder 59 being connected together to establish electrical connection for respective 180° displaced positions, a saving in connection wires required to be employed for connecting the axle commutator AC with the motor is accomplished by similarly connecting together the oppositely disposed commutator segments of the axle commutator AC. It is thus provided that the application of energy by the brushes of the axle commutator brush holder 21 to a wire extending to an oppositely disposed pair of brushes on the brush holder 59 of the motor is accomplished twice for each revolution of the axle 12 because of the connection of the oppositely disposed commutator segments to this wire. There are therefore three different pairs of brushes on the brush holder 59 connected by three wires with three different pairs of segments on the axle commutator AC.

In using the correspondence checking system provided according to the present invention for the purpose illustrated in the embodiment shown in the drawings, it is not necessary to check close correspondence in the rotation of the respective driving and driven shafts 12 and 51 as it is only required that a check be maintained as to fidelity of the speed of rotation of the motor drive for the centrifuge 93 and for the recorder. In fact it is desirable to permit a certain degree of out of correspondence in order to permit a certain amount of lagging or leading due to the inertia of the apparatus, particularly the centrifuge 93, at a time when there is a sudden change in speed of the axle 12 which is driving the axle commutator AC.

In connection with the tolerable degree of out of correspondence due to effects of inertia of the centrifuge 93, the use of the spring coupling including the spring 75 as shown in Fig. 7 as a means of coupling the motor shaft 51 to the ratio selector, provides a certain amount of flexibility torsionally in the drive so that the motor shaft 51 is not as directly affected by the inertia of the gearing and of the centrifuge 93. By the compression of the springs 75 the motor shaft 51 is permitted to remain in closer correspondence under these conditions with the driving axle 12 than would be possible if the shaft 51 were directly connected to the ratio selector gearing.

Although in accordance with the above considerations it has been desirable to permit as much out of correspondence relationships as possible between the driving and driven shafts, it is to be understood that the system of checking correspondence herein disclosed may be applied under conditions where it is desirable to maintain a check of closer correspondence, and under these conditions, it may be desirable to provide a larger number of correspondence checking segments on the axle commutator AC, and a smaller contacting sector on the motor commutator so that a small difference in follow up of the motor axle 51 to the rotation of the axle 12 may be detected.

It is to be understood that although the commutator disc 57 of the motor commutator as viewed in Fig. 12 has been illustrated as being constructed of insulating material except for the sector 228 and the ring 234, it may be desirable in practice to employ metal strips about the periphery of the commutator disc 57 against which the brushes of the brush holder 59 bear as a means for reducing wear and preventing the possibility of the brushes being fouled by insulating material wearing from the disc 57. It is thus desirable in practice to use metallic plates as bearing plates, such plates being insulated from each other, and each plate being of a length less than the spacing of adjoining brushes about the periphery of the brush holder 59 so that there can be no shortening of adjoining brushes by these metal plates. This structure has been indicated by the metal segments 256 (see Fig. 8) secured by the screws to the commutator disc 57. The showing of the commutator disc 57 in Fig. 12 is therefore to be considered as a part of a schematic showing facilitating the understanding of the mode of operation of the system, rather than illustrating the preferred structure to be employed in practice.

For a consideration of the mode of operation of the five position recorder relay which has had its structure already fully described, it will be assumed that a signalling system and a train control system of the continuous inductive type are employed so as to obtain on the vehicle steadily energized relays which are indicative of the respective signal aspects that are provided. These relays can be assumed to be controlled by distinctive code rates of pulses received by the vehicle in a manner disclosed, for example, in the patent granted to Reichard et al. No. 2,223,131, dated November 26, 1940, and in the patent granted to P. W. Smith, No. 2,326,049, dated August 3, 1943. According to these patents, the normal conditions of operation with a clear track ahead calls for the relays 180RP, 120—180RP, 75RP, and CRFP to be maintained in their picked up positions in accordance with the reception of a 180 code which is transmitted through the track rails.

Under these conditions, if the power switch SW2 governing energization of the recorder relay is closed, the upper left-hand winding 181 of the recorder relay as viewed in Fig. 10 is energized through front contact 245 of relay 180RP. The energization of this winding attracts the associated armature 190 and causes the stylus operating finger 202 to be pivoted clockwise about the pin 200 so as to be actuated to its uppermost position as viewed in Fig. 10. The stylus 178 under these conditions marks the recording paper 252 along a line comparable to the line G which is indicative of a prior recording of the least restrictive signal aspect (green).

If the next restrictive aspect (green over yellow) is to be recorded, the relay 180RP is deenergized, and thus the circuit that has been described for the energization of the winding 181 is opened at front contact 245. The circuit is then closed for the winding 184 including back contact 245 of relay 180RP and front contact 246 of relay 120—180RP. The energization of this winding causes the attraction of the associated armature 190 so as to actuate the stylus operating finger 202 in a clockwise direction about the pin 201 as a pivot point so as to cause the stylus 178 to mark the recording tape along a line comparable to the mark G/Y which indicates the recording of a similar aspect at a prior time.

If it is assumed that the next restrictive aspect (yellow over green) is to be recorded, the relays 180RP and 120—180RP are both dropped away, and thus the circuits for the windings 181 and 184 are opened at front contacts 245 and 246 of relays 180RP and 120—180RP respectively. The winding 182 is energized under these conditions through back contacts 245 and 246 of relays 180RP and 120—180RP respectively and through front contact 247 of relay 75RP. The energization of this winding 182 attracts the associated armature 190 and thus actuates the stylus operating finger 202 about the pivot point 201 counter-clockwise so as to provide a mark on the recording tape 252 at a position comparable to the mark Y/G which is indicative of the aspect yellow over green which is provided in accordance with the reception of a 75 code rate transmitted through the track rails over which the vehicle is passing.

The relay CRFP is energized upon the reception of steady alternating current for selecting a yellow aspect, and the winding 183 is energized at this time through a circuit comprising back contacts 245, 246, and 247 of relays 180RP, 120—180RP, and 75RP respectively, and front contact 248 of relay CRFP. Upon the energization of this winding, the associated armature 190 is attracted, and the stylus operating finger 202 is actuated counter-clockwise around the pivot point 200 to establish a mark on the recorder tape 252 comparable to the mark Y which is indicative of a yellow signal aspect.

In case no energy is received from the track rails, all of the code responsive relays illustrated are deenergized, and thus there is no energy applied to the windings of the five position recorder so that the stylus operating finger 202 assumes its center biased position to provide a mark on the recorder paper comparable to the mark R which is indicative of a red signal aspect.

In accordance with usual practice in train control systems, it is required that a trainman acknowledge certain restrictive indications, and the actuation of an acknowledgement button (not shown) under these conditions is effective to pick up an acknowledgement relay such as the relay AC which is shown in the above mentioned patent to P. W. Smith. It is desirable to record such acts of acknowledgement, and therefore it is provided that the energization of the acknowledgement relay AC applies energy as indicated in Fig. 10 to the winding of the two position acknowledgement recorder relay 176. This energy is supplied through the front contact 249 of the acknowledgement relay AC.

It is to be understood that the circuit means that has been described for actuation of the five position recorder relay is merely indicative of a specific condition of signal recording, and that the recorder is readily adaptable to the recording of different combinations of signal aspects provided by different signal control means than that which has been disclosed in accordance with the requirements of practice.

Although the relay has been described as a five-position relay, it will be readily apparent that two other distinctive operating positions may be obtained if required by energization of various windings in combination. Thus, if it is required that additional distinctive markings be provided, a distinctive mark can be made by energization of the windings 181 and 184 simultaneously whereby the stylus actuating finger 202 is actuated in a clockwise direction as shown in Fig. 10 so as to position the stylus 178 to an extreme upper position, above the level of the mark G on the recorder tape 252. Similarly, another distinctive position of the stylus 178 can be accomplished by energizing simultaneously the windings 183 and 182 when the windings 181 and 184 are deenergized. This energization obviously would actuate the stylus operating finger 202 counter-clockwise so as to position the stylus 178 below the level of the mark Y on the recorder tape 252.

Having thus described a specific train recorder and speed contactor mechanism as one embodiment of the present invention, it is to be understood that this form has been disclosed principally to illustrate a typical form of structure and mode of operation, and that various modifications, adaptions and alterations may be applied to the specific form shown to meet the requirements of practice within the limits of the scope of the appending claims.

What we claim is:

1. A recording device comprising in combination, two laterally spaced C-shaped magnetic structures, oppositely disposed cores within each of said C-shaped structures, a winding on each of said cores, an armature disposed within the open end of each C-shaped magnetic structure and extending between the oppositely disposed cores of that structure, spring biasing means for maintaining said armature spaced from each of its associated cores when the associated windings are deenergized, and a stylus operating finger pivoted by both of said arms at spaced points whereby the energization of each of the windings actuates the stylus operating finger to a different position.

2. A recording device comprising in combination, two laterally spaced C-shaped magnetic structures having a common back portion, two oppositely disposed cores in each of said structures, an armature for each of said magnetic structures extending through the opening in that C-shaped structure and between the associated cores, said armature being pivoted at said common back portion, means for biasing said armature midway between its associated cores, a winding on each of said cores, and a stylus operating arm pivoted by the respective armatures at spaced points so as to be operated from its biased position to any selected one of four distinctive positions in accordance with the selective energization of the winding.

3. A recording device comprising in combination, two laterally spaced electromagnetic structures, each of said structures comprising two oppositely disposed cores and associated windings spaced from each other, an armature for each of said structures disposed in the space between the cores of that structure, a stylus operating finger pivoted by the armatures of said structures at spaced points, and a stylus at one end of said finger whereby said stylus can be actuated to four distinctive positions by the selective energization of said windings.

4. A recording device comprising in combination, two laterally spaced electromagnetic structures, each of said structures comprising two oppositely disposed cores and windings spaced from each other, an armature for each of said structures disposed in the space between the associated cores, means for biasing each of the armatures to a point midway between the associated cores, an articulated stylus operating finger having a stylus secured at one end thereof, said finger being pivoted by the respective armatures at spaced points, whereby said stylus is actuated to a different degree from its biased position by the energization of a winding of one structure than by the energization of the corresponding winding of the other structure.

5. A recording device comprising in combination, two laterally spaced electromagnetic structures, each of said electromagnetic structures comprising two oppositely disposed cores and associated windings spaced from each other, an armature for each of said electromagnetic structures disposed in the space between the oppositely disposed cores, said armature being pivoted at one end, a stylus operating finger pivoted at longitudinally spaced points by the respective armatures, and spring biasing means for biasing the armatures to an intermediate position when the windings of the associated electromagnetic structures are both deenergized.

6. A speed recording system for recording the speed of an axle comprising in combination, an axle commutator adapted to be driven by the axle having several stepping contacts disposed about its periphery, a motor having a stator electrically connected to said commutator so as to be driven step by step in accordance with said commutator, a recorder having a platen and a stylus, a centrifuge for actuating said stylus, a spring coupling, gear driving means for driving said centrifuge and said platen from said motor, said means including said spring coupling whereby any irregular rotation of the shaft of said motor due to the step by step rotation of its field is absorbed by said spring coupling to prevent chatter in the bearing, and electro-responsive means including a commutator driven by said motor for checking relative rotary correspondence of said axle commutator and said motor.

7. A speed recording system for recording the speed of an axle comprising in combination, an axle commutator driven by said axle having several contact points spaced about its periphery, a motor having its stator electrically connected through the respective contact points of said commutator so as to have set up therein when energized with direct current a field rotating in synchronism with the rotation of said commutator, a recorder having a platen and a stylus, a centrifuge for actuating said stylus, a spring coupling, gear driving means including said spring coupling for driving said centrifuge and said platen from said motor, whereby some of the inertia of said centrifuge and said gear driving means is absorbed in said spring coupling at times when there is a sudden change in the speed of the motor, and electro-responsive means including a commutator driven by said motor for checking relative rotary correspondence of said axle commutator and said motor.

8. A speed recording system for recording the speed of an axle comprising in combination, an axle commutator adapted to be driven by the axle having several contact points spaced about its periphery, a motor having a stator electrically connected through the respective contact points of said commutator to a source of direct current so that a rotating field is set up therein rotating in correspondence with the axle, a recorder having a platen and a stylus, a centrifuge for actuating said stylus, a variable ratio gear selector, gear driving means for driving said centrifuge and said platen from said motor, said means including said variable ratio gear selector whereby the speed of actuation of said centrifuge and said recorder platen can be changed to compensate for wear of the wheel of a vehicle which drives the commutator, and electroresponsive means including a commutator driven by said motor for checking relative rotary correspondence of said axle commutator and said motor.

9. A recorder for recording the speed of rotation of the axle of a vehicle comprising in combination, a recorder platen, a stylus, an articulated stylus operating finger for actuating said stylus along said platen, a support pivoting said stylus operating finger to permit actuation of said stylus across said platen, retracting linkage operatively connected to said finger and effective to move said finger longitudinally as said finger is actuated about its pivot point to an extent to obtain straight line actuation of said stylus across said platen, an actuating shaft, a centrifuge for governing the axial movement of said shaft, and linkage for actuating said stylus operating finger about said pivot point in accordance with the axial movement of said shaft by said centrifuge.

10. A speed recording system for recording the speed of an axle of a vehicle comprising in combination, a commutator driven by the axle, a recorder platen and a stylus, a centrifuge for actuating said stylus, a motor adapted by energization through said commutator to follow the speed of rotation of said axle, gear driving means for driving said centrifuge in one direction or the other in accordance with the direction of rotation of said motor, and overrunning clutch gear driving means for driving said platen from said motor, said overrunning clutch means being effective to drive said platen in a predetermined direction, irrespective of the direction of rotation of said motor.

11. A speed contacting system actuated by the axle of a vehicle comprising in combination, an axle commutator adapted to be driven by the axle, a plurality of pairs of contacts for controlling a device in accordance with the speed of the axle, a cam for actuating said contacts, a centrifuge for actuating said cam, a motor adapted by energization through said commutator to follow the speed of said axle, a spring coupling, gear driving means for driving said centrifuge through said spring coupling from said motor, whereby the inertia of said centrifuge is somewhat absorbed by said spring coupling in times of sudden change in the speed of said motor, and electro-responsive means including a commutator driven by said motor for checking relative rotary correspondence of said axle commutator and said motor.

12. In a speed contactor actuated in accordance with the speed of rotation of an axle, an axle commutator driven by the axle having several contact points spaced about its periphery, a motor having a stator electrically connected through the respective contact points of said commutator to a source of direct current so that a rotating field is set up therein rotating in correspondence with the axle, a plurality of pairs of contacts for controlling a device in accordance with the speed of the axle, a cam for actuating said contacts, a centrifuge for actuating said cam, gear driving means for driving said centrifuge from said motor, and electroresponsive means including a commutator driven by said motor for checking relative rotary correspondence of said axle commutator and said motor.

13. A speed contactor control system for actuation in accordance with the speed of rotation of an axle for a vehicle comprising in combination, an axle commutator adapted to be driven by the axle and having several contact points spaced about its periphery, a motor having a stator electrically connected through the respective contact points of said commutator to a source of direct current so that a rotating field is set up therein rotating in correspondence with the axle, a plurality of pairs of contacts for controlling a device in accordance with the speed of the axle, a cam for actuating said contacts, a centrifuge for actuating said cam, gear driving means for driving said centrifuge from said motor, whereby said speed contacts can be located remote from the axle and actuated in accordance with the speed of the axle without requiring mechanical coupling between the axle and the drive for the centrifuge, and electroresponsive means including a commutator driven by said motor for checking relative rotary correspondence of said axle commutator and said motor.

References Cited in the file of this patent

UNITED STATES PATENTS

| 2,297,481 | Krussmann | Sept. 29, 1942 |

FOREIGN PATENTS

| 676,447 | Germany | May 11, 1939 |